Patented June 7, 1927.

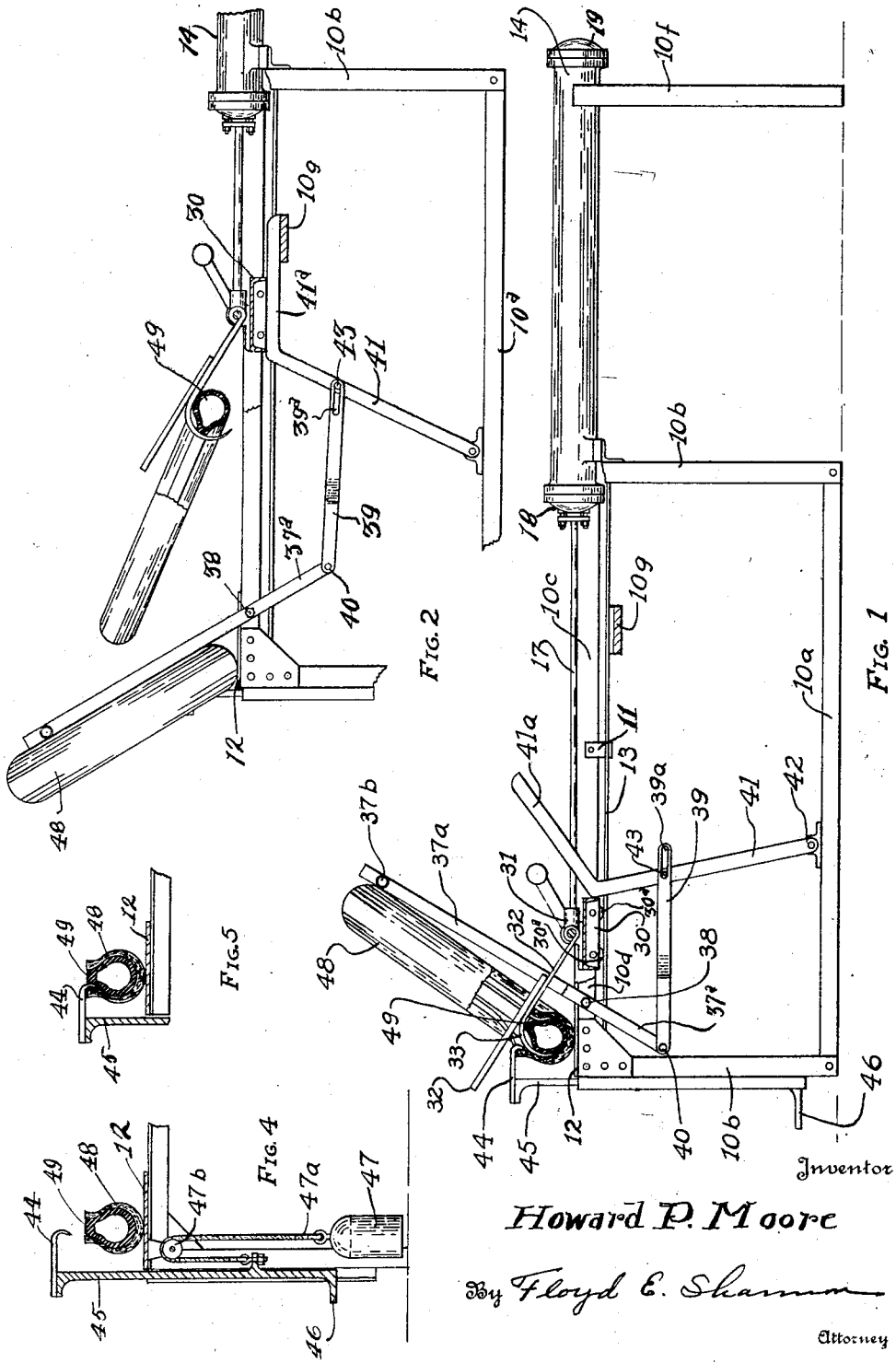

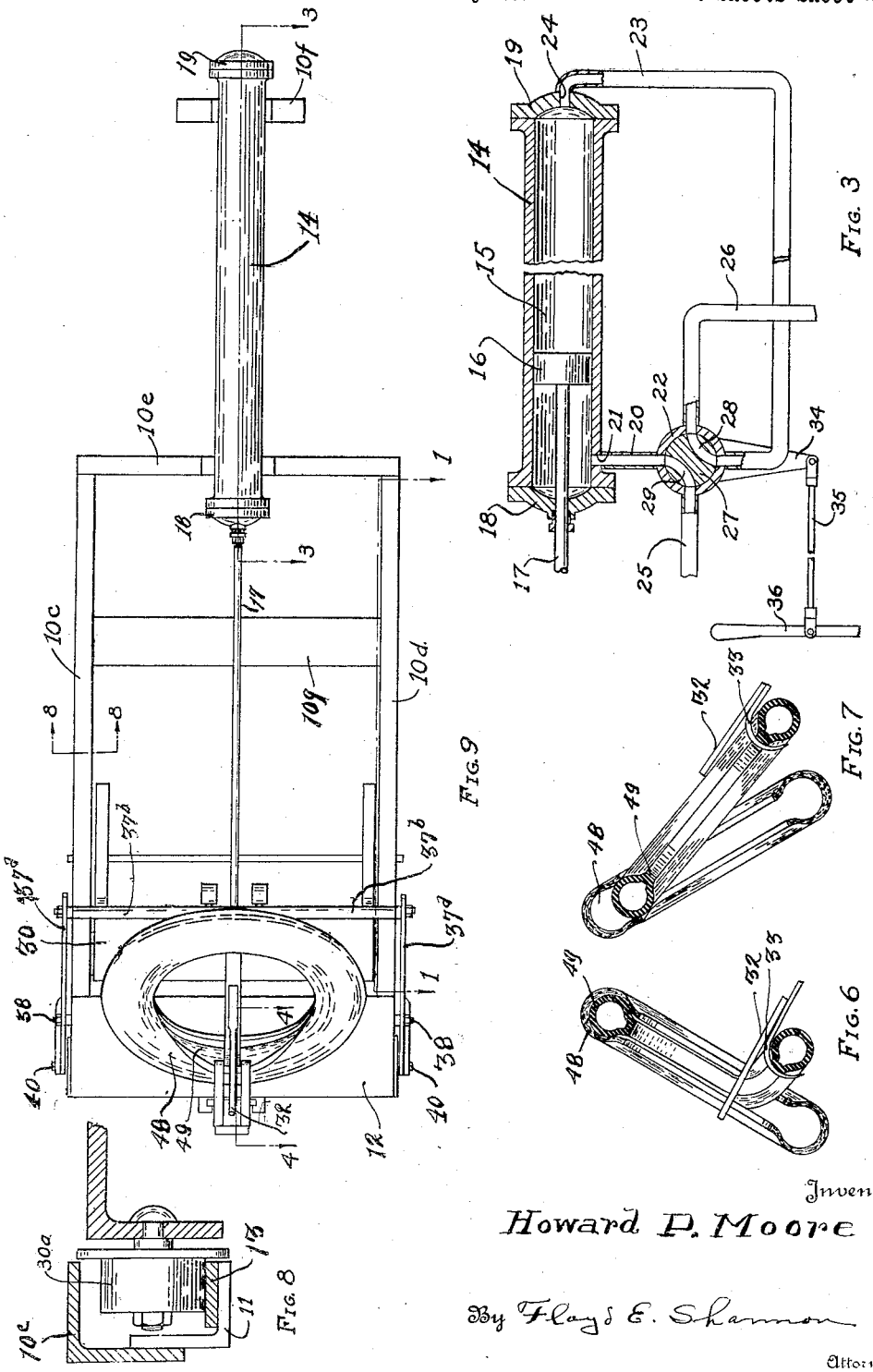

1,631,281

UNITED STATES PATENT OFFICE.

HOWARD P. MOORE, OF CUYAHOGA FALLS, OHIO, ASSIGNOR TO THE MOHAWK RUBBER COMPANY, OF AKRON, OHIO, A CORPORATION OF NEW YORK.

MACHINE FOR REMOVING AIR BAGS FROM TIRES.

Application filed July 29, 1926. Serial No. 125,745.

This invention relates to new and novel improvements in machines for removing annular air bags from pneumatic tire casings.

In the manufacture of pneumatic tire casings, an annular air bag is inserted in the casing. The casing is locked and fluid pressure is introduced within the bag to extend the casing and compress the same against the wall of the mold during vulcanization. As soon as the vulcanizing process is completed the air bag should be removed. This process requires the utmost care as both the casing and the air bag are exceedingly hot and are easily stretched, broken or otherwise injured.

Attempts have been made to design machines for this purpose by providing means for holding the casing in a fixed position, while the air bag is engaged by a hook which moves in a straight line to remove the bag from the casing. As the opening to the cavity of the tire casing is presented at the inner, circumferential edge of the casing, the pull was exerted on a line extending at a sharp angle to said edge, requiring considerable force and stretching and buckling the bag whereby it was soon rendered unfit for use.

Objects of this invention are to provide a machine of simple, durable construction, which will overcome the above named objections and may be quickly and conveniently used to remove annular pressure bags from tire casings without injury to the casing or to the bag.

A particular object is to provide means whereby a tire casing may be inclined to present the opening at one side of the casing to a hook so that the bag may be easily engaged and removed from that side of the casing and to provide means for oppositely inclining the casing during the pulling movement to present the opening at the other side thereof to the line of pull whereby the bag may be drawn from the tire with a minimum of effort and without buckling or stretching the same.

A further object is to provide a device of the character above described and to operatively connect and synchronize the various parts thereof whereby the removal operation may be automatically and quickly performed.

The above objects are accomplished and additional ends are attained by the novel construction, combination and arrangement of parts hereinafter described and illustrated in the accompanying drawing wherein I have shown a preferred form of the invention, it being understood that the invention is capable of various adaptations and that changes and modifications may be made which come within the scope of the claims hereunto appended.

In the drawings which form a part hereof like characters of reference are employed to designate like parts as the same may appear in any of the several views and in which:—

Figure 1 is a side elevational view of a machine constructed in accordance with this invention, showing the same with parts removed and with certain parts shown in vertical section, the same also illustrating a tire casing with an air bag positioned therein, a portion of the casing and the air bag being broken away to more clearly illustrate the invention.

Figure 2 is a similar side elevational view with parts broken away and parts shown in vertical section, the same illustrating the position of the tire with the air bag withdrawn therefrom.

Figure 3 is a longitudinal, vertical, sectional view of the air cylinder employed in carrying out the invention, the same being shown with parts broken away to conserve space.

Figure 4 is a vertical, sectional view taken as indicated by the line 4—4 of Figure 9, the same illustrating the forward portion of the machine showing a tire casing with an air bag positioned therein as the same is initially positioned to receive the holding hook.

Figure 5 is a similar view showing the holding hook operatively positioned between the air bag and one side of the tire.

Figure 6 is a vertical, sectional view of a tire casing and air bag showing the position of the bag during the first part of the pulling movement.

Figure 7 is a similar view showing the position of the tire casing and bag during the latter part of the pulling movement.

Figure 8 is a vertical sectional view taken as indicated by the lines 8—8 of Figure 9.

Figure 9 is a plan view of a machine constructed in accordance with this invention showing a tire casing as it is positioned thereon during the initial pulling movement.

Proceeding now to a detailed description of the invention with reference to the adaptation thereof illustrated in the drawings, the numeral 10 is used to denote a frame which may be of any desired construction and which in the drawings comprise a base member 10$^a$, upright members 10$^b$ which are provided on the upper ends thereof with side members 10$^c$ and 10$^d$. The frame also includes an end member 10$^e$ which extends along the rear end of the frame. The side members 10$^c$ and 10$^d$ are preferably formed of L-shaped channel iron and each is secured to the frame with one part of the channel projecting inwardly along the top of the frame and the other side positioned vertically along the outer edge of the frame. The numeral 13 is used to denote track members which extend longitudinally of the frame, one of said members 13 being secured to each of the side members 10$^c$ and 10$^d$ in parallel spaced relation to the top part thereof by means of the brackets 11. The numeral 12 denotes a plate or table which is secured across the frame at the forward end thereof to support a tire thereon.

The numeral 14 denotes a hollow cylinder which is supported in a horizontal position with the forward end thereof secured to the end member 10$^e$ and the rear end thereof supported by the standard 10$^f$. The cylinder 14 is provided with a bore 15 in which is mounted a piston 16. The numeral 17 denotes a piston rod which is slidably mounted in a suitable head 18 whereby it may be moved longitudinally of the track 13. The cylinder 14 is provided at the rear end thereof with a closure cap 19. The numeral 20 denotes a pipe which is secured in a suitable bore 21 in the forward portion of the cylinder. The pipe 20 is operatively connected to a four-way valve 22. A pipe 23 is operatively secured in a bore 24 at the other end of the cylinder 14. The pipe 23 is also connected to the four-way valve 22. The numeral 25 denotes a pipe which leads from a supply of air or other fluid under pressure and is operatively attached to the valve 22.

The numeral 26 denotes an exhaust pipe which leads from the valve 22. The valve 22 is provided with a rotatable core 27 which is provided with the passage 28 and 29 whereby the valve may be operated to move the piston 16 in either direction in said cylinder. The core 27 is provided with a suitable handle 34 to which is connected the rod 35 which extends forward and is secured to the lever 36, whereby the lever 36 may be operated to impart a rotary movement to the core 27 and operate the piston 16.

The numeral 30 denotes a flat carriage which is disposed transversely across the frame so as to be positioned between the frame members 10$^c$ and 10$^d$. The carriage 30 is provided on each end thereof with wheels 30$^a$ which are operatively mounted on the track members 13 for movement to and from the table 12. The rod 17 is connected as at 31 to the carriage 30. The numeral 32 denotes an arm which is hingedly secured to the carriage for movement in a vertical plane extending longitudinally of the track 13. The arm 32 is provided with a hook 33 which is adapted to be entered in a tire casing as hereinafter described.

The numeral 37 is used generally to denote a rack which is composed of the side pieces 37$^a$ and the cross bars 37$^b$. Each of the side pieces 37$^a$ are pivotally connected to the outer face of one of the top frame members 10$^c$ and 10$^d$ by means of the bolts 38 or other suitable means. The bolt 38 is positioned in close spaced relation to the forward end of the frame 10 so as to provide means whereby the rack 37 may be moved on an axis disposed at a right angle to the piston rod 17. Each of the side pieces 37$^a$ project downwardly beyond the frame members 10$^c$ and 10$^d$ and a strap 39 is pivotally secured to the lower end of each of said side pieces 37$^a$ by means of the bolts 40 or other suitable means. The numeral 41 denotes lever members, one of which is hingedly connected to the base 10$^a$ of the frame 10 at each lateral side thereof as at 42 for a movement on an axis parallel to the axis of the movement of the rack 37. The upper end 41$^a$ of each lever 41 is bent or otherwise formed to extend at an angle to the body of the lever 41. The strap 39 is provided on the rear end thereof with an elongated slot 39$^a$ in which is received a bolt 43 which is secured in the lever 41 at a point intermediate its height. The vertical portion of each of the levers 41 is of sufficient length to engage the rear face of the carriage 30 whereby a rearward movement of the carriage 30 will move the levers 41. As the bolt 43 is normally positioned on the forward end of the slot 39$^a$, the levers 41 may travel a predetermined distance before exerting a pull on the straps 39 and moving the rack 37. As soon as the pins 43 engage the rear walls of the slots 39, the rack 37 will be thrown forwardly as shown in Figure 2. At this point, the straight portion of the levers 41 will be swung away from the carriage 30 and the carriage will engage the angle portion of said lever, to hold the rack 37 in a forward position during the further rearward movement of the carriage 30. When the carriage 30 reaches a point where the upper end of the straight portion of the lever is moved to a plane immediately below the carriage it engages the angle portion 41$^a$ of said lever and forces the angle portion against the stop 10ᵍ during the further rearward movement of the carriage. When the carriage 30 is moved in a forward direction, the lever 41 will be released and the tire rack 37 may be swung to its original position as shown in Figure 1.

The numeral 44 denotes a hook which is slidably mounted on the forward end of the frame 10. The hook 44 is mounted on a vertical standard 45 which is slidably mounted on the forward face of the frame 10 and is provided on the lower end thereof with a step or pedal 46. The numeral 47 denotes a weight which is secured to a cable 47ᵃ and extends over the sheave 47ᵇ to normally hold the hook 44 in an upward position.

In use, a casing 48 having an air bag 49 therein is placed on a table 12 in an upright position as shown in Figure 4. The operator then places his foot on the pedal 46 moving the standard 45 downwardly and entering the hook 44 between the forward edge of the casing and an air bag 49 as shown in Figure 5. The operator then tilts the casing 38 to a forward position against the rack 37 and operates the hook 33 by means of the handle 32, to enter the said hook between the forward edge of the casing 48 and the air bag 49 as shown in Figure 1. The lever 36 is then operated to rotate the core 27 and bring the pipe 25 into communication with the inlet pipe 20 and to bring the pipe 23 into communication with the pipe 26. Fluid pressure is thus introduced in the forward portion of the bore 15 of the cylinder 14, thus moving the piston 16 rearwardly in said cylinder. As the piston 16 is thus moved rearwardly the hook 35 engages the air bag 49 and draws it from the lowermost portion of the tire as shown in Figure 6. At this point the bolt 43 reaches the rear end of the slot 39ᵃ and the rack 37 is inclined forwardly as shown in Figures 2 and 7. The further rearward movement of the piston 16 will thus pull the air bag 49 from the tire.

It will thus be seen that the air bag 49 is engaged by the hook 43 and drawn from the lower portion of the tire when the opening of the tire is inclined toward the line of pull and that the position of the tire will be changed as the bag is drawn therefrom so that the opening in the upper portion of the casing 48 will be inclined toward the line of pull when the bag is drawn from that portion of the tire.

While I have shown and described the invention with the bag pulling means operating in a horizontal line, it is to be understood that elements and parts of the machine may be arranged to operate in a vertical line or in any desired plane. While I have shown bag pulling means movable in a certain direction and tire pulling means movable in an opposite direction, it is to be understood that the action of co-operating parts may be reversed to secure the same relationship of movement.

Having thus illustrated my invention and described the same in detail, what I claim as new and desire to secure by Letters Patent is:—

1. In a device of the class described, a suitable frame, a tire rack pivotally mounted thereon for swinging movement between a forward inclination and a rearward inclination, a tire support positioned forwardly of said rack, a downwardly presented, vertically operable hook mounted forwardly of said support, a track on said frame, said track extending rearwardly from said support, a carriage on said track, a downwardly presented forwardly projecting hook hingedly connected to said carriage and means to move said carriage on said track, said means also moving said rack from one inclined position to the other.

2. In a device of the class described, a suitable frame, a tire rack pivotally mounted thereon for swinging movement between a forward inclination and a rearward inclination, a tire support positioned forwardly of said rack, a downwardly presented vertically operable hook mounted forwardly of said support, a track on said frame, said track extending rearwardly from said support, a carriage on said track, means carried by said carriage for engaging an air bag positioned in a tire mounted in said support, means to move said carriage on said track and means operated by the movement of said carriage for moving said rack from one inclined position to the other.

3. In a device for removing annular air bags from tire casings, a frame; a tire support, said support including a base plate mounted on said frame and a rack pivotally mounted for swinging movement from one inclined position to another, a downwardly presented vertically operable hook mounted forwardly of said plate, said hook adapted to engage the forwardly presented edge of a casing positioned on said support, a track on said frame, said track extending rearwardly from said support, a carriage on said track, a downwardly presented, forwardly projecting hook hingedly connected to said carriage, said hook adapted to be entered in a casing positioned on said support to engage an air bag therein, means to move said carriage on said track and means controlled by the movement of said carriage for moving said rack from one inclined position to the other.

4. In a device of the class described, a frame, a tire rack pivotally mounted thereon for swinging movement from a rearward to a forward inclination, a tire support mounted forwardly of said rack, a vertically operable hook at the forward end of said support, a track, said track extending rearwardly from said support; a carriage on said track, a bag pulling hook hingedly mounted on said carriage, means to move said carriage on said track and means automatically operable to move said rack from a rearward to a forward inclination during a rearward movement of said carriage.

5. In a device of the class described, a frame, a tire rack mounted thereon for tilting movement from a rearward to a forward inclination, a tire support mounted forwardly of said rack, means to engage the forwardly presented edges of a tire positioned on said support, a track, said track extending rearwardly from said support, a carriage on said track, a bag engaging hook hingedly mounted on said carriage, means to move said carriage on said track, means to tilt said rack during the movement of said carriage, said tilting means being automatically operable after the carriage has traveled a predetermined distance.

6. In a device of the class described, a tire rack mounted for tilting movement from one inclined position to another, a tire support mounted forwardly of said rack, a hook at the forward end of said support, said hook operable to engage the forward edge of a tire positioned on said support, a track, said track extending rearwardly from said support, a carriage on said track, a bag pulling hook mounted on said carriage, said hook operable to engage an air bag positioned in a tire mounted on said support, means to move said carriage to tilt said rack during the movement of said carriage.

7. In a device of the class described, a tire support, a rack mounted for movement from a rearward inclination to a forward inclination and bag pulling means operable in a line disposed at a right angle to the axis of said rack.

8. In a device of the class described, a tire support, a rack pivotally mounted for movement on a horizontal axis adjacent said support, bag pulling means operable in a horizontal line extending at a right angle to the axis of said rack.

9. In a device of the class described, a tire support, said support including a rack, said rack being movable from a rearward inclination to a forward inclination and a bag pulling hook, means to move said hook and means to simultaneously move said rack in the opposite direction.

10. In a device of the class described, in combination, tire supporting means bag pulling means and a rack mounted for pivotal movement from a forward to a rearward inclination.

11. In a device of the class described, in combination, tire supporting means said supporting means including a rack mounted for pivotal movement between a forward and a rearward inclination and bag pulling means, said bag pulling means operable in a line disposed at a right angle to the axis of movement of said rack.

12. In a device of the class described, in combination, tire supporting means; a rack mounted for tilting movement between a forward and a rearward inclination and a bag engaging member, means to move said member away from said support and means to tilt said rack forwardly during said movement.

13. In a device of the class described, means to support a tire in an inclined position, bag pulling means movable away from said supporting means, means to move said bag pulling means and means to oppositely incline said tire during the movement of said pulling means.

14. In a device of the class described, bag pulling means operable in a straight line, means to support a tire at an inclination to said line, means to operate said bag pulling means and means to oppositely incline said tire during the operation of said pulling means.

In testimony whereof I have hereunto set my hand.

HOWARD P. MOORE.